US006708024B1

(12) United States Patent
Yip

(10) Patent No.: US 6,708,024 B1
(45) Date of Patent: Mar. 16, 2004

(54) METHOD AND APPARATUS FOR GENERATING COMFORT NOISE

(75) Inventor: Philip Chu Wah Yip, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/401,088

(22) Filed: Sep. 22, 1999

(51) Int. Cl.[7] .......................... H04B 17/00; G10L 21/02

(52) U.S. Cl. .................... 455/226.4; 455/296; 704/210; 704/228

(58) Field of Search ................................ 455/226.4, 95, 455/570, 550, 296, 297, 300, 303, 310; 704/210, 215, 201, 205, 220, 258, 228, 214; 370/330, 337, 348, 349; 375/245, 240.04, 243; 379/406.01, 406.05, 406.04, 406.07, 406.09

(56) References Cited

U.S. PATENT DOCUMENTS 5,475,712 A * 12/1995 Sasaki ........................ 375/241
5,537,509 A * 7/1996 Swaminathan et al. ..... 704/228
5,539,858 A * 7/1996 Sasaki et al. ............... 704/212
5,568,514 A * 10/1996 McCree et al. ............. 375/245
5,630,016 A * 5/1997 Swaminathan et al. ..... 704/228
5,722,086 A * 2/1998 Teitler et al. ............... 455/561
5,754,537 A * 5/1998 Jamal ......................... 370/330
5,778,338 A * 7/1998 Jacobs et al. ............ 704/200.1
5,960,389 A * 9/1999 Jarvinen et al. ............ 704/215
6,055,497 A * 4/2000 Hallkvist et al. ........... 704/228
6,160,886 A * 12/2000 Romesburg et al. ... 379/406.05
6,163,608 A * 12/2000 Romesburg et al. ... 379/406.01
6,269,331 B1 * 7/2001 Alanara et al. ............... 455/95
6,347,081 B1 * 2/2002 Bruhn ........................ 370/337
6,578,162 B1 * 6/2003 Yung .......................... 714/708

* cited by examiner

*Primary Examiner*—Erika Gary
(74) *Attorney, Agent, or Firm*—Williams, Morgan & Amerson, P.C.

(57) ABSTRACT

A method and apparatus are provided for generating comfort noise in a communication device. The method includes receiving a signal, scaling the signal to a preselected value, indicating whether an error occurred during transmission of the signal, and providing the scaled signal as an output signal in response to receiving the indication that the error occurred during transmission. The apparatus includes a scaler for receiving a signal and being capable of scaling the signal to a preselected value. The apparatus includes an indicator capable of indicating that an error occurred during transmission of the signal, wherein the scaled signal is provided as an output signal in response to an indication that the error occurred during transmission.

21 Claims, 5 Drawing Sheets

METHOD AND APPARATUS FOR GENERATING COMFORT NOISE

BACKGROUND OF THE INVENTION

1. Field of the Invention

The present invention relates generally to communications, and, more particularly, to a method and apparatus for generating comfort noise in a communications device, such as a cordless telephone.

2. Description of the Related Art

The telecommunications industry has undergone explosive growth over the past several years. A significant contribution to this growth has been the high demand for radio communication services, such as cordless telephone service, for example. Cordless telephones provide a greater flexibility to users than traditional landline phones by allowing them to move freely, not being tethered to the landline telephone system.

A typical cordless telephone system includes a handset unit and a base unit. The base unit is coupled to a telephone line and includes an antenna, a transmitter, and a receiver for communicating via radio frequencies with the handset unit. A local power line generally supplies the power for the base unit. The handset unit includes a speaker and a microphone, and also an antenna, a transmitter and a receiver for likewise communications with the base unit. Typically, the handset unit is powered by at least one battery. This battery is usually charged by the local power line when the handset unit is placed inside a cradle of the base unit.

The base and handset units generally communicate through transmission of digital signals. Typically, analog speech signals are digitized and coded before transmission. Speech signals are digitized because digitized signals are less susceptible to channel noise since they may be regenerated, as well as amplified, along the way, thereby reducing the possibility of being corrupted by the transmission system. On the receiving end, digitized signals are decoded and converted back to its analog form. A CODEC (CODing and DECoding device) commonly performs the coding/decoding functions, and sometimes analog-to-digital (A/D) and digital-to-analog (D/A) conversions. Since the base and handset units transmit, as well as receive signals, each unit typically includes a CODEC.

To achieve a greater bandwidth, cordless telephone systems employ voice compression algorithms. One popular voice compression algorithm is Adaptive Differential Pulse Code Modulation (ADPCM). The ADPCM scheme takes advantage of a high sample-to-sample correlation that exists in speech waveforms to reduce a transmission bit rate, while preserving an overall signal quality. In the ADPCM scheme, an analog voice signal is converted into digital representation and compressed into a lower bit stream through an encoding process for transmission.

Transmitted digitized, compressed signals, however, may not reach the intended destination error free. For example, a transmission from the base unit of the cordless telephone to the handset unit may include an error or errors such that quality of voice is jeopardized. Additionally, the transmission errors may introduce noise that result in undesirable sound, thereby causing discomfort to a listener on the receiving end.

The present invention is directed to overcoming, or at least reducing the effects of, one or more of the problems set forth above.

SUMMARY OF THE INVENTION

In one aspect of the present invention, a method is provided. The method includes receiving a signal, scaling the signal to a preselected value, indicating whether an error occurred during transmission of the signal, and providing the scaled signal as an output signal in response to an indication that the error occurred during transmission.

In another aspect of the present invention, an apparatus is provided. The apparatus includes a scaler for receiving a signal and being capable of scaling the signal to a preselected value. The apparatus includes an indicator capable of indicating that an error occurred during transmission of the signal, wherein the scaled signal is provided as an output signal in response to an indication that the error occurred during transmission.

BRIEF DESCRIPTION OF THE DRAWINGS

The invention may be understood by reference to the following description taken in conjunction with the accompanying drawings, in which like reference numerals identify like elements, and in which.

5

Figure 1:
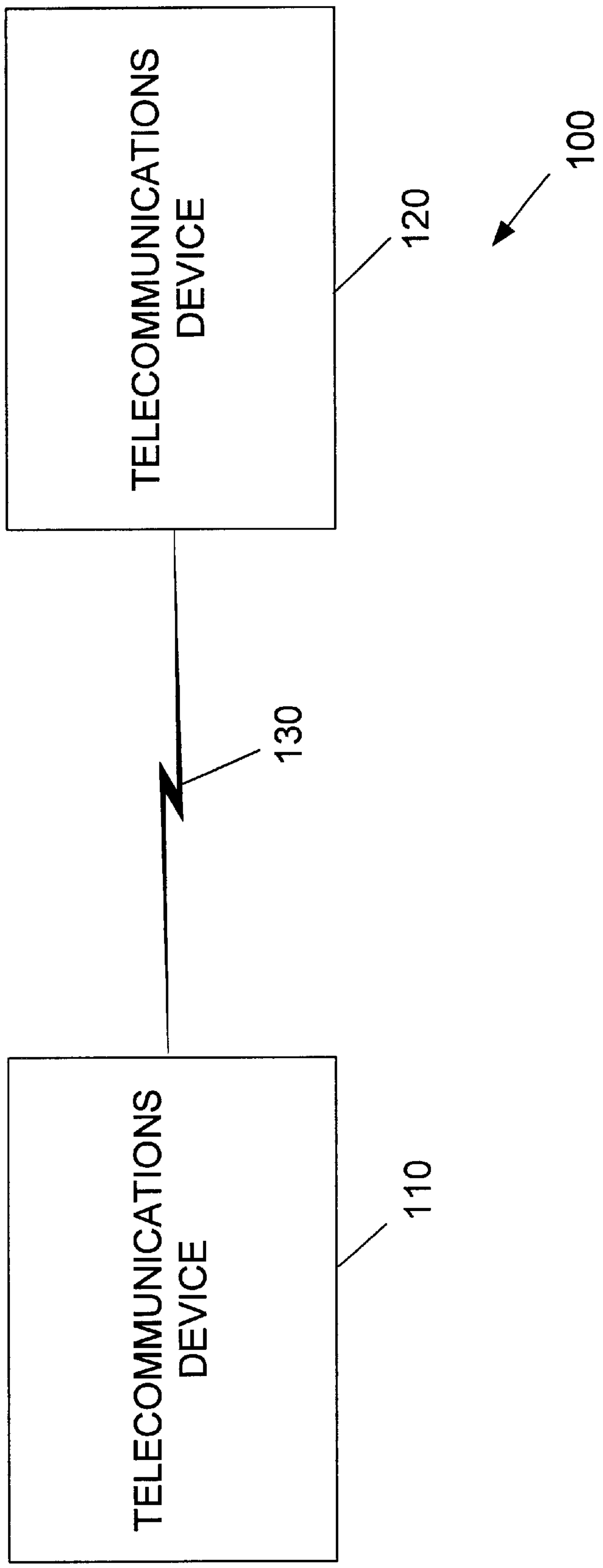
FIG. 1 is a simplified block diagram of a communications system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the figures, and in particular to FIG. 1, a block diagram of a communications system 100 in accordance with the present invention is illustrated. FIG. 1 includes a first telecommunications device 110 capable of communicating with a second telecommunications device 120 over a connection 130. The connection 130 may be a wire-line connection or a wire-less connection, depending on the application. In one embodiment, the communications system 100 may include communication between any two telephones or communications within a telephone system, such as between a handset and base station of a cordless telephone system. In an alternative embodiment, the communications system 100 may include communication between any telecommunications devices 110, 120 capable of performing substantially an equivalent function of a telephone, which may include, but not limited to, transmitting and/or receiving voice and data signals. Examples of the telecommunications devices 110, 120 include any telephone employing a digital signal processor or any data processing system (DPS) utilizing a modem to perform telephony, a television phone, a wireless local loop, a DPS working in conjunction with a telephone, Internet Protocol (IP) telephony, and the like. IP telephony is a general term for the technologies that use the Internet Protocol's packet-switched connections to exchange voice, fax, and other forms of information that have traditionally been carried over the dedicated circuit-switched connections of the public switched telephone network (PSTN). One example of IP telephony is an Internet Phone, a software program that runs on a DPS and simulates a conventional phone, allowing an end user to speak through a microphone and hear through the DPS speakers. The calls travel over the Internet as packets of data on shared lines, avoiding the tolls of the PSTN.

Figure 2:
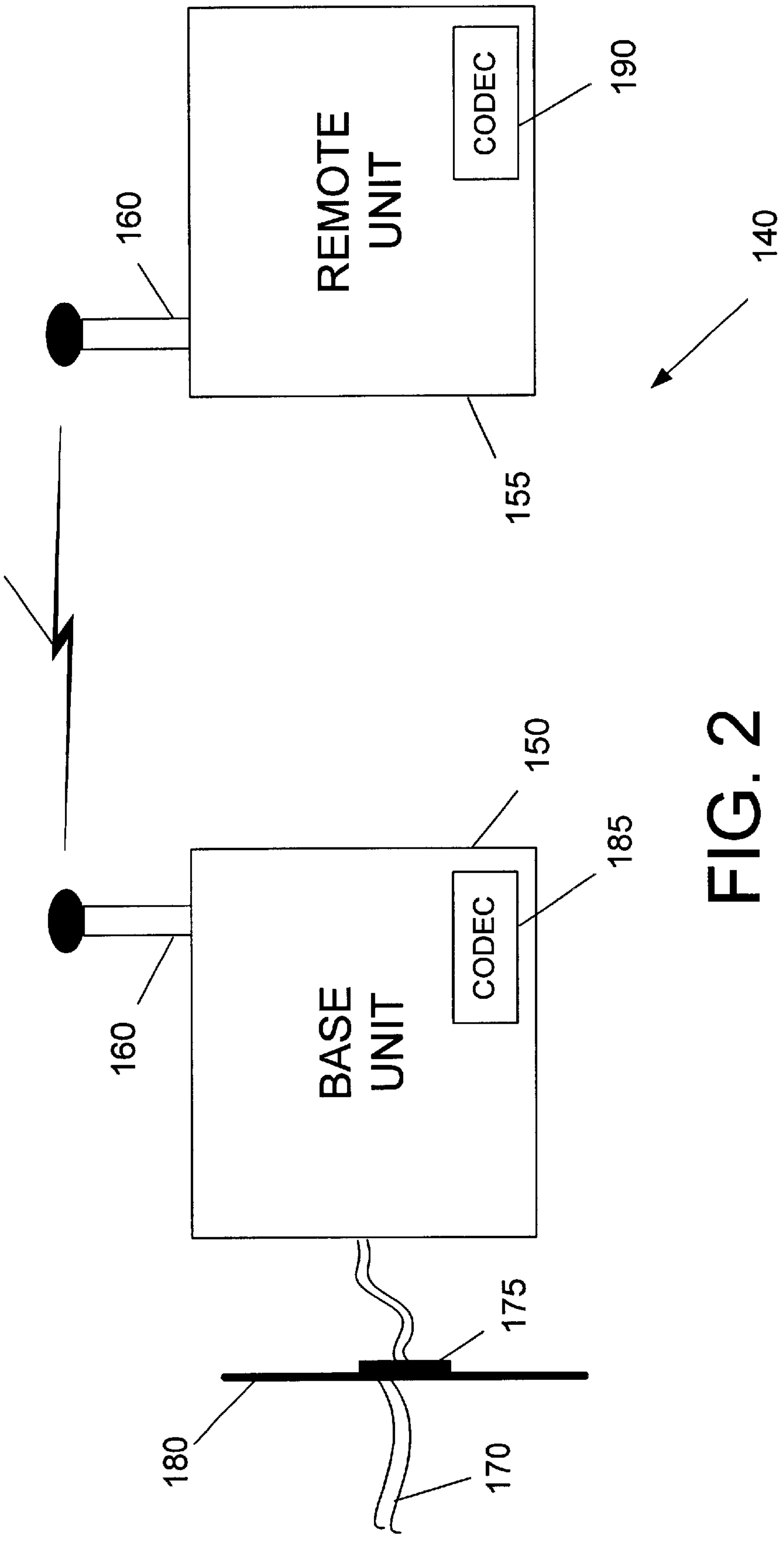
FIG. 2 is a simplified block diagram of one embodiment of the communications system of FIG. 1.

Turning now to FIG. 2, a stylized block diagram of one embodiment of the communications system 100 of FIG. 1 is shown in accordance with the present invention. In the illustrated embodiment, the communications system 100 is a cordless telephone system 140. Accordingly, the first telecommunications device 110 is a base unit 150 of the cordless telephone system 140, and the second telecommunications device 155 is a remote unit 155 of the cordless telephone system 140. The base and remote units 150, 155 each include an antenna 160 for communication over a wireless connection 165. In the illustrated embodiment, the connection 130 (see FIG. 1) is a wireless connection 165. The base unit 150 is coupled to an external line 170 via a telephone line interface 175 that is affixed to a fixed structure 180. The fixed structure 180, for example, may be a wall. The external line 170 may be a public switched telephone network (PSTN) line or a private branch exchange (PBX) line. The base unit 150 is coupled to the external line 170 to provide telephonic services to the remote unit 155. In accordance with one embodiment, the remote unit 155 includes conventional components (i.e., microphone, speaker, dial keypad, etc.) inherent to cordless phones. Such components are well known to those of ordinary skill in the art and are not discussed herein to avoid unnecessarily obscuring the present invention.

The base unit 150 includes a CODEC 185, and the remote unit 155 includes a CODEC 190 for performing requisite coding and decoding functions. Since the CODECs 185, 190 generally perform similar functions, in certain applications the two CODECs 185, 190 may be substantially similar.

Figure 3:
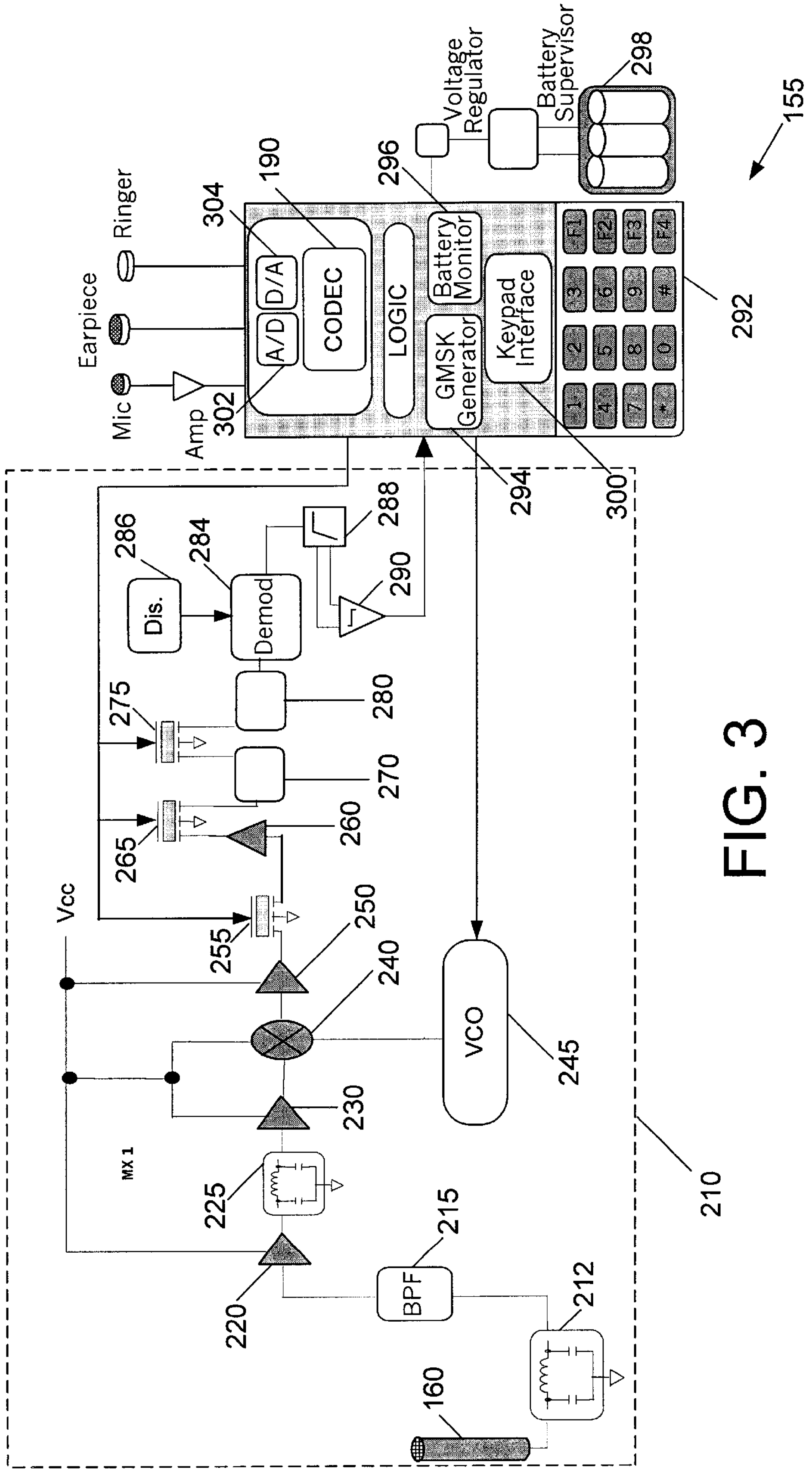
FIG. 3 depicts a stylized diagram of a remote unit of the communications system of FIG. 2.

As can be seen in FIG. 3, the disclosed embodiment of the instant invention is described herein with respect to the remote unit 155. However, it should be appreciated that the instant invention may also be applicable to the base unit 150. FIG. 3 illustrates a stylized block diagram of one embodiment of the remote unit 155 in accordance with the present invention. The remote unit 155 is capable of establishing a radio communication link with the base unit 150. In the interest of clarity and to avoid obscuring the invention, only that portion of the remote unit 155 that is helpful in understanding the invention is illustrated. More specifically, FIG. 3 illustrates a receive unit 210 of the remote unit 155 that may be utilized for receiving signals from the base unit 150. Those skilled in the art will appreciate that the remote unit 155 may also include a transmitting unit (not shown), as well as other logic for implementing other telephonic features such as a caller identification system, for example. Additionally, although the remote unit 155 illustrated in FIG. 3 employs a time division duplex (TDD) architecture, it is envisioned that the remote unit 155 may also employ a frequency division duplex (FDD) architecture without departing from the spirit of the instant invention.

The receive unit 210 receives a transmitted radio signal from the antenna 160, and passes the signal through a first impedance matching filter 212. The radio signal may comprise a plurality of signals, at least one of which may be carrying a synchronization signal transmitted by the base unit 150. The first impedance matching filter 212 matches the impedance of the antenna 160 with the impedance of the rest of the receive unit 210, thereby reducing the signal reflection from the remaining portion of the receive unit 210. An output signal from the first impedance matching circuit 212 is passed through a first bandpass filter 215, which filters out the unwanted frequencies from the radio signal. The radio signal is then passed through a first amplifier 220, and subsequently through a second impedance matching filter 225. The second impedance matching filter 225 matches the output impedance of the first amplifier 220 to the impedance of the rest of the receiving unit 210. Although not so limited, in the illustrated embodiment, the first and second impedance matching filters 212, 225 have a real 50-ohm impedance. Furthermore, in the illustrated embodiment, the center frequency of the first bandpass filter 215 is 900 MHz, and its band-width is approximately 2 MHz. Those skilled in the art will appreciate that the impedance of the impedance matching filters 212, 225, as well as the center frequency and bandwidth of the first bandpass filter 215, may vary, depending on the application in which they are employed.

The voice signal is then provided from the second impedance matching filter 225 to a second amplifier 230 and then to a mixer 240 (or downconverter). The mixer 240 mixes the incoming signal with a signal generated by a local oscillator 245 and provides an intermediate frequency (IF) signal. The intermediate frequency signal is substantially equal to the difference between the radio frequency signal and the oscillator frequency generated by the local oscillator 245. The IF signal from the mixer 240 is then provided to a third amplifier 250 and to a second bandpass filter 255. The output from the second bandpass filter 255 is amplified by a fourth amplifier 260, passed through a third bandpass filter 265, amplified by a first limiting amplifier 270, passed through a fourth bandpass filter 275, and then amplified by a second limited amplifier 280. In accordance with one embodiment of the present invention, the second, third, and fourth bandpass filters 255, 265, 275 are ceramic filters that have a center frequency of approximately 10.7 MHz and a bandwidth that is capable of allowing a channel through.

The output signal from the second limited amplifier 280 is provided to a demodulator 284, which outputs a voltage signal that is proportional to the frequency of the input signal. The demodulator 284 employs a discriminator 286 that allows the demodulator 284 to demodulate a wide bandwidth. The output signal from the demodulator 284 is passed through a low pass filter 288, which substantially removes unwanted noise from the voltage signal provided by the demodulator 284. An output of the low pass filter 288 is provided to a comparator 290, which compares the input signal against a threshold and provides a substantially square output that is then delivered to a controller 292 of the remote unit 155.

The controller 292 may, in one embodiment, control a variety of functions of the remote unit 155. For example, in the instant embodiment, the controller 292 includes a CODEC 190, GMSK generator 294, battery monitor 296 for monitoring usage of a battery 298, keypad interface 300, and analog-to-digital converter 302 and digit-to-analog converter 304 for converting analog signals to digital signals, and vice-versa. The CODEC 190, GMSK generator 294, battery monitor 296, keypad interface 300, and analog-to-digital converter 302 and digit-to-analog converter 304 are well known to those of ordinary skill in the art and are therefore not discussed in detail herein. The term "controller," as utilized herein, refers to control logic capable of providing one or more desirable functions for the remote unit 155. Accordingly, in one embodiment the controller 292 may provide fewer functions than the illustrated functions in FIG. 3, and in other embodiments it may provide additional functions not expressly illustrated in FIG. 3, such as a caller identification system (not shown), for example.

Figure 4:
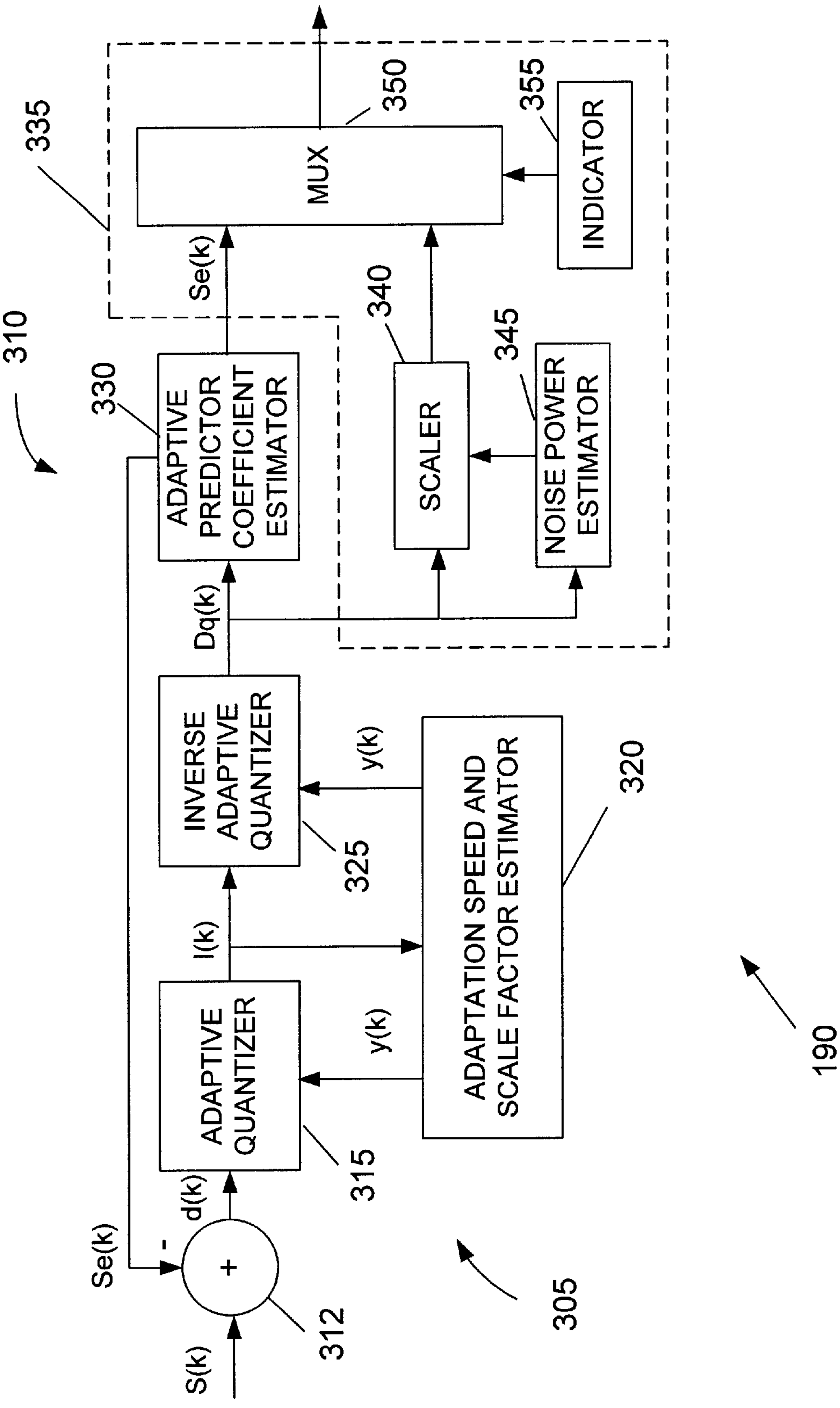
FIG. 4 illustrates a stylized block diagram of an encoder and decoder that may be employed in the remote unit of FIG. 2.

Turning now to FIG. 4, one embodiment of the CODEC 190 is shown in accordance with the present invention that may be employed by the remote unit 155. Specifically, the CODEC 190 comprises an ADPCM encoder 305 and decoder 310, wherein the decoder 310 is imbedded in the encoder 305. The ADPCM scheme is not described in detail herein, as it is well-known to those skilled in the art. Additionally, it will be appreciated that the instant invention is not limited the ADPCM scheme, but rather may be applicable to other compression schemes as well.

In the interest of clarity and to avoid obscuring the invention, only that portion of the CODEC 190 that is helpful in understanding the invention is illustrated. The encoder 305 receives a log-PCM input signal, S(k), and transcodes it to an ADPCM signal, I(k). Generally, a parity check may be performed on the I(k) signal, wherein parity bits associated with the I(k) signal are also transmitted along with I(k) signal. The input signal S(k) is provided to a first input terminal of a signal adder 312, while an estimate signal, Se(k), of the input signal S(k) is provided to a second terminal of the signal adder 312, which subtracts the Se(k) signal from the S(k) signal and provides a difference signal, d(k) to an adaptive quantizer 315. The adaptive quantizer 315 adaptively quantizes the difference signal, d(k). In one embodiment, the difference signal, d(k), may be adaptively quantized by taking the log (base 2) of the difference signal, d(k), then normalizing the d(k) signal by the quantization scale factor, y(k), and coding the result, I(k). The quantization scale factor y(k) is generated by an adaptation speed and scale factor estimator 320. The normalization provides the adaptation to the quantization and is based on past coded samples. In one embodiment, the adaptation is controlled bimodally, and comprises a fast adaptation factor for signals with large amplitude fluctuations (e.g., speech) and a slow adaptation factor for signals which vary more slowly (i.e., data). The adaptation speed and scale factor estimator 320, based on a speed-control factor, weighs the fast and slow adaptation factors to form a single quantization scale factor.

The decoder 310 receives the ADPCM signal, I(k), and transcodes it to a log-PCM signal, Se(k). The decoder 310 includes an inverse adaptive quantizer 325 that uses the I(k) signal to reconstruct a quantized version of the difference signal, Dq(k). The inverse adaptive quantizer 325 uses the same adaptive quantization characteristics as the adaptive quantizer of the encoder 305. The quantized difference signal, Dq(k), is input to an adaptive predictor 330, which then computes a signal estimate, Se(k). The Se(k) signal is provided to the signal adder 312, which then subtracts the Se(k) signal from the next input signal, S(k), to complete the feedback loop. Although not so limited, in the illustrated embodiment, the adaptive predictor 330 makes use of both an all-pole filter (not shown) and an all-zero filter (not shown). The all-pole filter is a second-order filter with constrained adaptive coefficient values designed to match the slowly varying aspects of the speech signal. Since the predictor 330 is particularly sensitive to errors, the predictor 330 makes use of a sixth-order all-zero filter to offer signal stability even with transmission errors.

Figure 5:
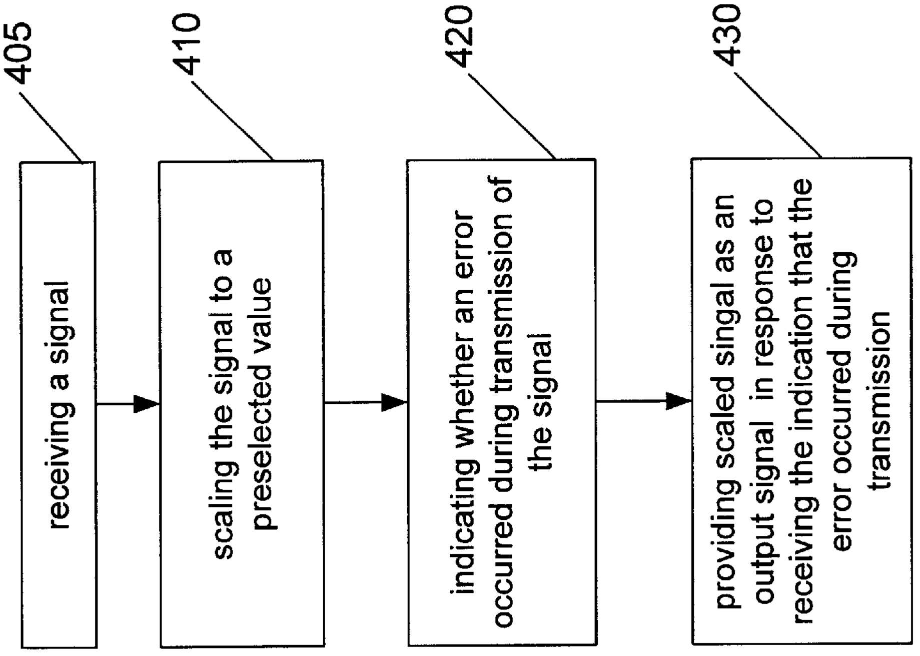
FIG. 5 illustrates one embodiment of a method in accordance with the present invention that may be implemented in the communications systems of FIGS. 1 and 2.

In accordance with the present invention, the decoder 310 includes a comfort noise generator 335. The comfort noise generator 335 includes a scaler 340, a noise power estimator 345, and a multiplexer 350 controlled by a indicator 355. The CODEC 190 employs a method of FIG. 5 to provide a suitable level of noise during communication between the base unit and remote unit, making the connection appear more alive. The method of FIG. 5 begins at block 405, where the quantized difference signal, Dq(k), is received. The quantized difference signal, Dq(k), may comprise a plurality of samples.

At block 410, the scaler 340 scales the Dq(k) signal by a scaling constant. The noise power estimator 345 provides the scaling constant to the scaler 340, after estimating the noise power based on the difference signal, Dq(k). The noise power estimator 345 in one embodiment estimates the instantaneous power as follows:

$$\text{power}(k)=0.85*\text{power}(k-1)+0.95*\,Dq(k)*Dq(k). \qquad (1)$$

where power(k−1) is the instantaneous power value of a previous sample.

The scaling constant may be computed once the value of power(k) is determined using the following equation:

$$\text{scaling\_constant}=\text{sqrt}(0.0001*1/\text{power}(k)) \qquad (2)$$

The scaler 340 generates the scaling constant such that the samples of the Dq(k) signals are below approximately −30 dB, thereby producing comfort level noise. Because the noise level in the quantized Dq(k) signal may vary substantially from one sample to another, the scaler 340, in conjunction with the instantaneous power value generated by the noise power estimator 345 based on a recursive algorithm, scales the Dq(k) sample to a comfort noise level. In one embodiment, the scaling constant may be obtained from a table, rather than computing equation (2), which requires a division operation. A table having pre-calculated values for given values of power(k) may be utilized to obtain a value for the scaling constant.

It should be appreciated that the constants utilized in equation (1), such as 0.85 and 0.95, may vary from one application to another, depending on the specific requirements. Likewise, constant in equation (2), namely 0.0001, may vary, depending on implementation requirements. Equations (1) and (2) may be one of any variety of equations that generate a scaling constant that scales the samples of the quantized difference signal, Dq(k), to a comfort noise level. For the purposes of this invention, a comfort noise level is any level that may not cause substantial discomfort to a user.

At block 420, the indicator 355 indicates whether an error occurred in the received signal during transmission. The indicator 355 in one embodiment may derive its signal from an existing error indicator of the remote unit 155. In the illustrated embodiment, the indicator. 355 is a parity check logic that identifies any errors in the transmission based on the parity bits that accompany the I(k) signal. The indicator analyzes the parity bits transmitted with the I(k) signal to identify erroneous transmissions. A Telecommunication devices 110, 120 (see FIG. 1) typically employ error-indicating logic (not shown) that identifies erroneous transmissions, and, accordingly, the signal from such logic may be utilized for the same purpose as that served by the indicator 355.

At block 430, the mutliplexer 350 provides the scaled signal from the scaler 340 in response to an indication that the error occurred during transmission. If the indicator 355 indicates no transmission error, then the estimate signal, Se(k) from the adaptive predictor coefficient estimator 330 is provided from the multiplexer 350.

The present invention provides a suitable level of noise for a conversation over the connection 165 without a separate signal generator. That is, no separate generator is required to produce a signal that provides an acceptable level of noise to the connection 165. Instead, the instant invention scales the received quantized difference signal, Dq(k), to provide the a suitable level of noise to the connection 165.

It is noted that the present invention is not limited to telephony, and, instead, may also be applicable to wireless LAN, wireless telemetry, and any other wireless technology employing ADPCM compression scheme or any other compression schemes. The comfort noise generator 335 (see FIG. 4) may be implemented in hardware, software, or any combination thereof. Additionally, the steps of the method of FIG. 5 may be implemented within a digital signal processor (not shown).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:

receiving a signal, wherein the signal is a quantized signal;

scaling the signal to a preselected value, wherein scaling the signal comprises estimating a power of the quantized signal;

indicating whether an error occurred during transmission of the signal; and providing the scaled signal as an output signal in response to receiving the indication that the error occurred during transmission.

2. The method of claim 1, further including providing quantized signal as an output signal in response to an indication that no error occurred during transmission.

3. The method of claim 1, wherein the preselected value comprises a comfort level noise value.

4. The method of claim 1, wherein the preselected value is about −30 dB.

5. The method of claim 1, wherein indicating whether an error occurred during transmission of the signal includes analyzing parity bits associated with the signal.

6. The method of claim 1, wherein estimating the power of the quantized signal comprises estimating an instantaneous power of the quantized signal.

7. An apparatus, comprising:

a scaler for receiving a signal and scaling the signal to a preselected value, wherein the signal is a quantized signal, and wherein the scaler scales the signal in response to an instantaneous power of a sample of the quantized signal;

an indicator for indicating that an error occurred during transmission of the signal, wherein the scaled signal is provided as an output signal in response to an indication that the error occurred during transmission;

an adaptive predictor coefficient estimator for receiving the signal and providing a speech signal, wherein the speech signal is provided as the output signal in response to an indication that no error occurred during transmission; and a multiplexer for receiving the quantized signal and the speech signal, wherein the multiplexer provides the scaled signal as the output signal in response to the indication that the error occurred during transmission.

8. The apparatus of claim 7, wherein the indicator indicates the error in response to analyzing parity bits associated with the quantized signal.

9. The apparatus of claim 7, wherein the preselected value comprises a comfort level noise value.

10. The apparatus of claim 9, wherein the preselected value is about −30 dB.

11. A telecommunications device, comprising:

a remote unit;

a base unit communicating with the remote unit, the base unit comprising:

a scaler for receiving a quantized signal and scaling the quantized signal to a preselected value, wherein the scaler includes a noise power estimator for estimating a noise power of a sample of the quantized signal; and an indicator for indicating that an error occurred during transmission of the quantized signal, wherein the scaled signal is provided as an output signal in response to an indication that the error occurred during transmission.

12. The telecommunications device of claim 11, further including an adaptive predictor coefficient estimator for receiving the quantized signal and providing a speech signal, wherein the speech signal is provided as the output signal in response to an indication that no error occurred during transmission.

13. The telecommunications device of claim 12, further including a multiplexer for receiving the quantized signal and the speech signal, wherein the multiplexer provides the scaled signal as the output signal in response to the indication that the error occurred during transmission.

14. The telecommunications device of claim 11, wherein the indicator indicates the error in response to analyzing parity bits associated with the quantized signal.

15. The telecommunications device of claim 11, wherein the preselected value comprises a comfort level noise value.

16. The telecommunications device of claim 15, wherein the preselected value is about −30 dB.

17. An apparatus, comprising:

means for receiving a signal, wherein the signal is a quantized signal;

means for scaling the signal to a preselected value, wherein the means for scaling the signal comprises means for estimating a power of the quantized signal;

means for indicating whether an error occurred during transmission of the signal; and means for providing the scaled signal as an output signal in response to receiving the indication that the error occurred during transmission.

18. An apparatus, comprising:

a quantizer adapted to receive a transmitted signal and provide a quantized signal;

a signal generator adapted to generate a comfort noise signal based upon the quantized signal, wherein the signal generator includes a noise power estimator adapted to provide an estimated noise power;

an indicator adapted to provide a control signal based upon a detection of an error associated with the transmitted signal; and a selector adapted to provide at least one of the quantized signal and the comfort noise signal based upon the control signal.

19. The apparatus of claim 18, wherein the signal generator includes a scaler adapted to generate the comfort noise signal by scaling the quantized signal using the estimated noise power.

20. The apparatus of claim 19, wherein the selector is a multiplexer.

21. The apparatus of claim 18, wherein the quantizer includes an adaptive quantizer and an inverse adaptive quantizer.

* * * * *

UNITED STATES PATENT AND TRADEMARK OFFICE
CERTIFICATE OF CORRECTION

PATENT NO. : 6,708,024 B1
DATED : March 16, 2004
INVENTOR(S) : Philip Chu Wah Yip It is certified that error appears in the above-identified patent and that said Letters Patent is hereby corrected as shown below:

Column 2,
Line 30, replace "5Figure 4" with -- Figure 4 --.

Column 7,
Line 1, replace "indicator." with -- indicator --.

Signed and Sealed this

Twenty-fifth Day of May, 2004

JON W. DUDAS
*Acting Director of the United States Patent and Trademark Office*